W. H. VANSKIVER.
EMERGENCY SPINDLE FOR AUTOMOBILES.
APPLICATION FILED APR. 7, 1913.
1,076,471.
Patented Oct. 21, 1913.
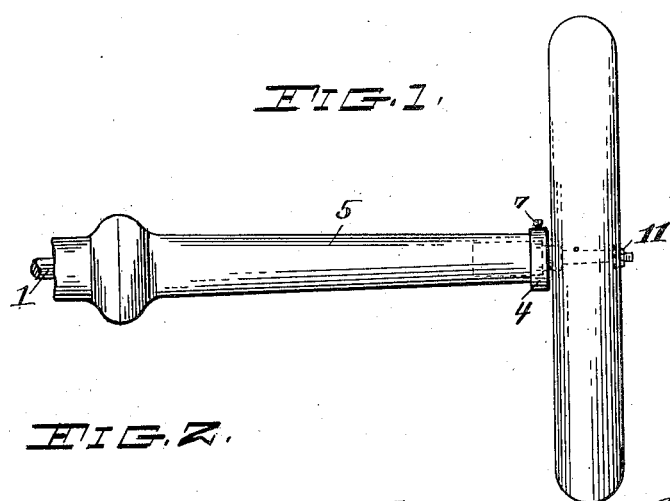
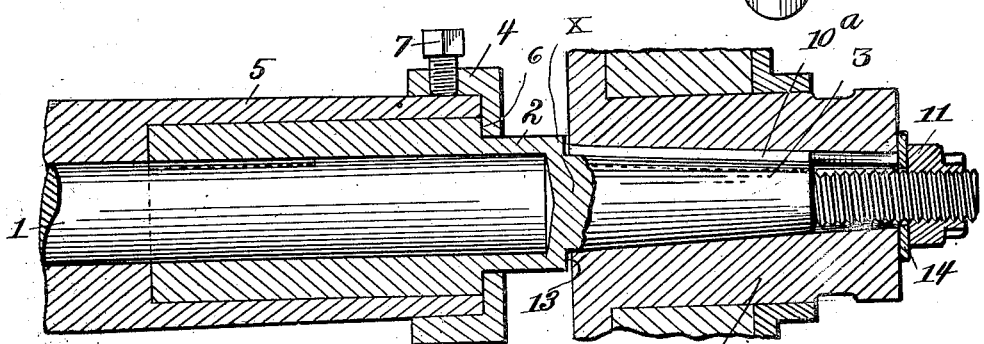
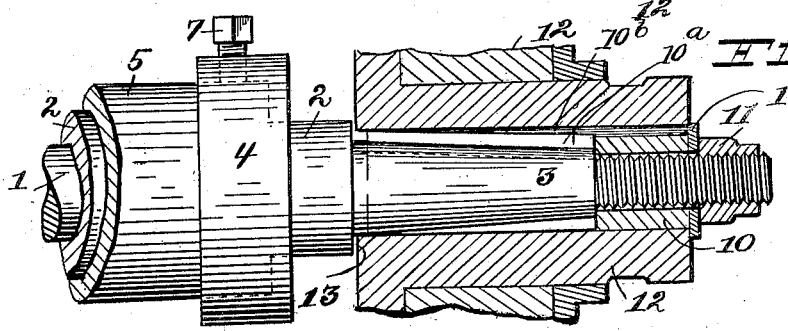
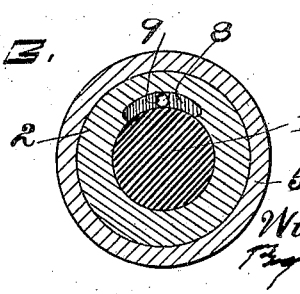
Witnesses:
J. C. Tunner
Sylvia Boron.
Inventor
William Harvey Vanskiver
By Bend Miller
Attorneys.

UNITED STATES PATENT OFFICE.

WILLIAM HARVEY VANSKIVER, OF LEETONIA, OHIO, ASSIGNOR TO AUTO MACHINE COMPANY, OF LEETONIA, OHIO, A PARTNERSHIP COMPOSED OF ELLSWORTH HAROLD AND WILLIAM HARVEY VANSKIVER, BOTH OF LEETONIA, OHIO.

EMERGENCY-SPINDLE FOR AUTOMOBILES.

1,076,471.     Specification of Letters Patent.     Patented Oct. 21, 1913.

Application filed April 7, 1913. Serial No. 759,284.

*To all whom it may concern:*

Be it known that I, WILLIAM HARVEY VANSKIVER, a citizen of the United States, residing at Leetonia, in the county of Columbiana and State of Ohio, have invented certain new and useful Improvements in Emergency-Spindles for Automobiles, of which the following is a specification.

My invention relates to emergency spindles for automobiles and like vehicles, in which I employ a spindle to take the place of the ordinary spindle.

The objects of the present invention are, first, to provide a spindle upon which a wheel can be mounted, and second, to attach the spindle to a broken axle. These objects, together with other objects, readily apparent to those skilled in the art I attain by the construction illustrated in the accompanying drawings, although my invention may be employed in a variety of other mechanical forms, the construction illustrated being chosen by way of example.

In the accompanying drawing Figure 1 is a view showing the emergency spindle properly attached to an axle. Fig. 2 is a longitudinal section of a portion of the stationary casing, the rotatable housing and spindle, partially in section showing a hub mounted upon the spindle, also showing a section of the retaining ring or collar, also the axle or shaft in proper relationship with reference to said parts. Fig. 3 is a transverse section of the axle or shaft, the stationary housing and an end view of the connecting pin and its slot. Fig. 4 is a side elevation of the emergency spindle properly connected showing a hub properly mounted upon the emergency spindle.

Similar numerals of reference indicate corresponding parts in all the figures of the drawing.

In the accompanying drawing, 1 represents an ordinary axle, such as commonly used in automobiles, and the particular axle shown is of the Ford type. Upon the axle 1 is mounted the housing or sleeve 2 which is provided with the integral axle 3, and the sleeve is driven by the axle 1. In actual use the spindle is more liable to break near the end of the driving axle or shaft 1, at or near the point X, which breaking causes the vehicle to be entirely put out of commission, means must be employed to put the disabled automobile into condition to be towed or driven.

If the automobile is to be towed it may require a truck or other similar appliance or in order to put the automobile in condition to be driven entirely new parts must be added. With my improved device I am enabled to replace a portion of the broken spindle by removing from the stationary housing, the bearing, and in its place is substituted the sleeve 2, upon the outer end of which can be mounted the original wheel. The substitute spindle, which is constructed in substantially the same manner as the original spindle can be and is mounted on the wheel formerly mounted upon the original spindle.

For the purpose of holding the emergency or substituted spindle and its integral hollow and rotatable housing or sleeve 2 I provide the ring or collar 4, which collar is provided with right angled flanges, one of which flanges fits over and upon the stationary housing 5 and the other right angled flange fits against the shouldered end 6 of the hollow and rotatable housing and sleeve 2. For the purpose of securely connecting the ring 4 to the fixed housing 5 a set screw 7 or its equivalent is provided.

It will be understood that after the broken spindle has been removed together with its housing or bearing, the new spindle and its housing which is substituted and connected by means of the ring or collar 4, the wheel can be mounted upon the new spindle and the new spindle held against end movement by means of the inward extended flange of the ring 4 and the shoulder 6 on the end of the sleeve 2. If it is desired to rotatably connect the hollow sleeve 2 with the axle or shaft 1 said sleeve is provided with a recess or groove 8 formed in the hollow sleeve 2, which groove is formed somewhat tapering in either direction, the deepest portion of the groove being about midway between its parallel edges and of sufficient depth to allow a locking pin 9 to be inserted. By tapering the groove 8, the pin 9 will be crowded into the narrow portion of the groove or recess, thereby rotatably connecting the hollow sleeve 2 with the shaft or axle 1, by which arrangement the automobile can fact that the substitute spindle and integral sleeve takes the place of the broken one, and when connected by means of the ring or collar 4 is for emergency purposes, equal to the original spindle and its sleeve or housing.

For the purpose of properly mounting the wheel upon the substitute axle or spindle, the thimble 10 is provided, which thimble is located over the screw threaded portion of the spindle and is forced into position by means of the ordinary nut 11. For the purpose of rotatably coupling up the wheel with the substitute spindle, the key $10^a$ is placed in position as illustrated in Fig. 4, which key is located in the ordinary key ways and a portion of said key located in the groove or key way $10^b$ formed in the hub 12, but when the hub has a tapered bore as illustrated in Fig. 2, the entire length of the key $10^a$ will be seated in the key ways formed in the spindle and hub; but when a tapered bore is formed in the hub, the key will not be seated for its entire length in the groove of the hub, but in order to provide suitable bearings for the hub, the ring 10 is provided. In the drawings I have illustrated the hub in a conventional way as the specific construction of the hub has nothing to do with the present invention, except that a hub must necessarily be employed.

It will be understood that the usual washer 14 should be provided upon which the nut 11 abuts and serves the purpose of forcing the key or thimble 10 into position as shown in Fig. 4. It will also be understood that in some instances the break may not be at the point X, but I have pointed out wherein the spindle is most liable to become broken, but so far as the present invention is concerned it is immaterial as to the exact location of the break in as much as the substitute spindle can be employed regardless of the exact location of the break. It will be understood that the housing or sleeve 2 should be provided with the ordinary shoulder 13, which is located at the juncture of the spindle portion 3 or the hollow housing or sleeve 2.

Having fully described my invention what I claim as new and desire to secure by Letters Patent, is—

1. In a device of the character described, the combination of a spindle consisting of a spindle portion and an integral hollow sleeve, said sleeve portion adapted to be located upon the axle of an automobile and within the fixed casing, said sleeve provided with a shouldered end, a collar adapted to be connected to the fixed casing and abut against the shouldered end of the hollow sleeve and means for securing the collar in fixed position.

2. In a device of the character described, the combination of a spindle and an integral hollow sleeve, a fixed casing and an axle, said sleeve adapted to be located within the casing and upon a portion of the axle, a collar adapted to hold the integral spindle and hollow sleeve in fixed relationship with the fixed casing and axle and means for securing the collar upon the fixed casing.

3. In a device of the character described, the combination of a spindle and integral hollow sleeve, said hollow sleeve adapted to be located upon an axle and provided with a recess formed in its inner surface and a pin located within said recess, and means for securing the hollow sleeve in fixed position.

4. In a device of the character described, the combination of a spindle and integral hollow sleeve, said hollow sleeve adapted to be located upon an axle and provided with a recess formed in its inner surface, and a pin located within said recess and means for securing the hollow sleeve in fixed position, and a thimble located upon the screw threaded portion of the spindle and within a hub of a wheel.

5. In a device of the character described, the combination of a spindle consisting of a spindle portion and an integral hollow sleeve, said sleeve adapted to be located upon the axle of an automobile and within the fixed casing, said sleeve provided with a shouldered end, a collar adapted to be connected to the fixed casing and abut against the shouldered end of the hollow sleeve, means for securing the collar in fixed position and means for mounting a wheel upon the spindle.

In testimony that I claim the above, I have hereunto subscribed my name in the presence of two witnesses.

WILLIAM HARVEY VANSKIVER.

Witnesses:
 E. W. WARREN,
 FREIDA CHELLIS.